United States Patent [19]

Sultan et al.

[11] Patent Number: 5,499,319

[45] Date of Patent: Mar. 12, 1996

[54] FUZZY LOGIC CONTROLLER

[76] Inventors: Labib Sultan, 135 Old Shepherd, Willowdale, Ontario, Canada, M2J 3M1 Talib H. Al Janabi, #19 - 3333 McCarthy Road, Ottawa, Ontario, Canada, K1V 9X5;

[21] Appl. No.: 181,373

[22] Filed: Jan. 14, 1994

Related U.S. Application Data

[63] Continuation of Ser. No. 767,839, Sep. 30, 1991, abandoned.

[51] Int. Cl.$^6$ ..................................................... G06F 9/44
[52] U.S. Cl. ................................................. 395/3; 395/61
[58] Field of Search .................................. 395/3, 61, 900, 395/51, 22

[56] References Cited

U.S. PATENT DOCUMENTS

| | | | |
|---|---|---|---|
| 4,860,214 | 8/1989 | Matsuda et al. | 364/513 |
| 5,168,549 | 12/1992 | Takagi et al. | 395/3 |
| 5,175,801 | 12/1992 | Iokibe | 395/61 |

OTHER PUBLICATIONS

Procyk et al., "A Linguistic Self–Organizing Process Controller", Automatica, vol. 15, 1979, 15–30.
Togai et al., "Expert System on a Chip: An Engine for Real–Time Approximate Reasoning", IEEE Expert, Fall 1986, 55–62.
Leung et al., "Fuzzy Concepts in Expert Systems" IEEE Computer, Sep. 1988, 43–56.
Sugiyama, K., "Rule–Based Self–Organising Controller", Fuzzy Computing, 1988, 341–353.
Lim et al., "Implementing Fuzzy Rule–Based Systems on Silicon Chips", IEEE Expert, Feb. 1990, 31–45.
Watanabe et al., "A VLSI Fuzzy Logic Controller with Reconfigurable, Cascadable Architecture", Intl. Jou. Solid-–State Circuits, Apr. 1990, 376–382.
Zhijian et al., "A CMOS Current–Mode High Speed Fuzzy Logic Microprocessor for a Real–Time Expert System", Proc. 20th Intl. Symp. on Multi–Valued Logic, May 1990, 394–400.
Bowen, et al., "Conflict Resolution in Fuzzy Forward Chaining Production Systems", AAAI88, Aug. 1988, 117–121.
Sultan, L., "A Formal Approach for the Organization and Implementation of Fuzzy Micro–Processor Module," Fuzzy Computing, 1988, 201–221.

*Primary Examiner*—Robert W. Downs

[57] ABSTRACT

This invention relates to a design and implementation of real-time knowledge-based fuzzy controller system for general purpose industrial applications. The invention relates to the design of an Intelligent system which implements a decision-making procedure based on approximation, association and reasoning with fuzzy patterns and their clearness assessments rather than the use of Max-Min computation over fuzzy relational matrices usually applied in approximate reasoning procedures in similar systems. According to this design fuzzy controller is a device which operates at the level of fuzzy pattern processing where each control task is expressed through the attributes of fuzzy patterns (syntax and content, domain and clearness measure), and the elementary cognitive activities which the human performs with these patterns such as: recognition, generation, assessment, association, pattern matching, approximation, etc. The fuzzy controller utilizes a new scheme for approximate reasoning with fuzzy patterns called the Clearness Transformation Rule of Inference (CTRI). This mechanism offers a spectrum of advantages broadening the functional Intelligence of the controller to handle complex human rusks, improving performance and accuracy of the controller and reduces the computational requirements. The fuzzy controller presented in the invention can be applied in general engineering practice, financial, medical, process control, pattern recognition and other areas requiring knowledge-based behaviour in decision making.

23 Claims, 10 Drawing Sheets

TABLE 1. THE INPUT/OUTPUT ANALYSIS OF THE CTFLC TASKS.

| TASK-MODULE | INPUT | OUTPUT |
|---|---|---|
| FUZZIFIER | CRISP DATA: $X_i$ | ELEMENTARY FUZZY PATTERN: $P_A$; CLEARNESS ASSESSMENT: $C(P_A)$ |
| PATTERN MATCHING | FUZZY PATTERN: $P_A$ | ACTION PATTERN: $P_B$ |
| APPROXIMATE REASONING | CLEARNESS ASSESSMENT: $C(P_A)$ | CLEARNESS ASSESSMENT: $C(P_B)$ |
| DEFUZZIFIER | $P_B$ AND $C(P_B)$ | CRISP DATA: $y'$ |

FIG. 4A

TABLE 2. THE KNOWLEGDE REQUIRED TO PERFORM THE TASKS OF THE CTFLC SYSTEM

| TASK-MODULE | KNOWLEDGE PORTION NEEDED TO ACHIEVE TASK |
|---|---|
| FUZZIFIER | DOMAIN KNOWLEDGE: $D_{A,X}$; SYNTACTICAL KNOWLEDGE: $P_A$; KNOWLEDGE ON CLEARNESS DISTRIBUTION: $\Gamma(P_A)$ |
| PATTERN MATCHING | CONTROL RULES: $P_A \dashrightarrow P_B$ |
| APPROXIMATE REASONING | SITUATION ASSESSMENT KNOWLEDGE: $C(P_A)$ |
| DEFUZZIFIER | DOMAIN KNOWLEDGE: $D_B, Y$ KNOWLEDGE ON CLEARNESS DISTRIBUTION: $\Gamma(P_B)$ |

FIG. 4B

TABLE 3. THE REASONING STRATEGIES REQUIRED TO IMPLEMENT THE TASKS OF CTFLC

| TASK-MODULE | REASONING MODE NEEDED TO ACHIEVE TASK |
|---|---|
| FUZZIFIER | SUBSTITUTION OF DOMAIN INSTANTIAL MODELS GENERATE SYNTACTICAL PATTERNS |
| SITUATION ASSESSMENT | ASSESS PATTERNS AND CHOOSE THE PATTERN WITH A MAXIMUM CLEARNESS DEGREE OF ASSESSMENT |
| PATTERN MATCHING | FORWARD CHAINING STRATEGY OF SEARCH |
| APPROXIMATE REASONING | APPLY THE CTRI |
| DEFUZZIFIER | COUNTER REFLECTION OF THE CLEARNESS ASSESSMENT ON DOMAIN SPACE |

FIG. 4C

FUZZIFIER:

CRISP DATA — — — ► FUZZY PATTERN
CRISP DATA — — — ► CLEARNESS DEGREE OF A FUZZY PATTERN

PA' i — DENOTES A FORMAL DESCRIPTION OF THE ELEMENTARY FUZZY PATTERN PAi

C(PAi) — DENOTES THE CLEARNESS DEGREE OF THE ELEMENTARY FUZZY PATTERN PAi

DEFUZZIFIER:
FUZZY PATTERN & CLEARNESS DEGREE OF THE PATTERN ⟶ CRISP DATA
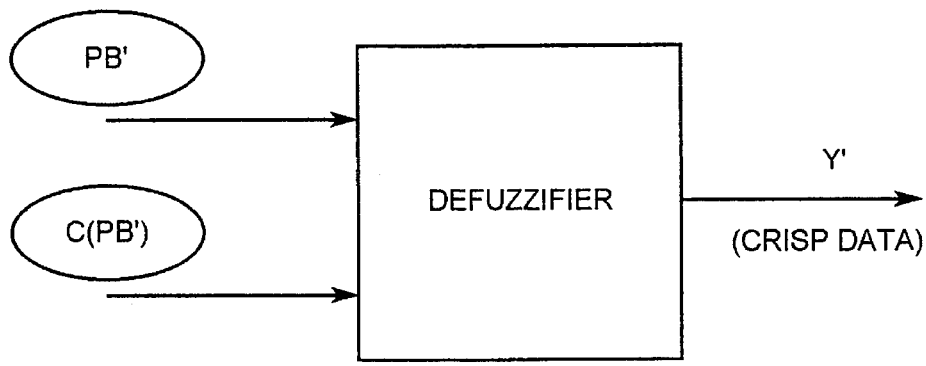
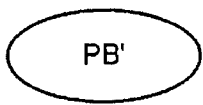
PB'  DENOTES A FORMAL DESCRIPTION OF THE ELEMENTARY FUZZY PATTERN PB'
C(PB')  DENOTES A CLEARNESS DEGREE OF THE ELEMENTARY FUZZY PATTERN PB'
FIG. 8

| $Lx_i$ | $x_i$ | $PA_i$ | $α_{k\,max}$ | RULE F-I | RULE F-II | RULE CONT | $PB_j$ | C APPROX | RULE DEF | $Ly_j$ | $y'_j$ |
|---|---|---|---|---|---|---|---|---|---|---|---|
| | | | | | | | | | | | |

$Lx_i$ — PROCESS VARIABLE NAME $x_i$ — CRISP DATA VALUES OF $Lx_i$ $PA_i$ — ELEMENTARY FUZZY PATTERN WHICH MOST ADEQUATELY MATCHES THE STATE OF $Lx_i$ FOR A GIVEN MODEL VALUE $xi$ GENERATING $α_{k\,max}$ $α_{k\,max}$ — MAXIMUM CLEARNESS DEGREE OF THE PATTERN $PA_i$ THAT MATCHES $Lx_i$ RULE F-I- SELECTED RULES OF FUZZIFIER-I WHICH GENERATE THE ELEMENTARY FUZZY PATTERN $PA_i$.

RULE F-II- SELECTED RULES OF FUZZIFIER-II THROUGH WHICH THE VALUE OF THE CLEARNESS DEGREE $α_{k\,max}$ IS GENERATED

RULE CONT.- SELECTED RULES OF THE PROCESS CONTROL PROTOCOL (CONTROL ACTIONS).

$PB_j$ — INFERRED FUZZY PATTERN OF THE CONTROL ACTION.

C APPROX- TRANSFORMED CLEARNESS DEGREE TO THE PATTERN OF THE CONTROL ACTION $PB_j$

RULE DEF- SELECTED RULES OF THE DEFUZZIFIER MODULE THROUGH WHICH THE CRISP VALUE OF THE CONTROL COMMAND IS GENERATED.

$Ly_j$ — CONTROL VARIABLE NAME.

$y'_j$ — CRISP DATA OF THE CONTROL ACTION (CONTROL COMMAND).

FIG. 10

FUZZY LOGIC CONTROLLER

This application is a continuation, of application Ser. No. 07/767,839, filed Sep. 30, 1991, now abandoned.

BACKGROUND

Existing fuzzy controller designs are based on the Compositional Rule of Inference (CRI) for approximate reasoning of L. A. Zadeh. This approach applies the notion of membership function to measure the compatibility of fuzzy linguistic categories, such as HIGH, LOW etc., with the crisp and deterministic values (usually measured, calculated or assigned) which are utilized to describe the state of the process variables and objects, such as TEMPERATURE, PRESSURE, etc. In this approach, the control rules (acquired from experts) are interpreted in the controller knowledge-base as fuzzy relations which are represented as fuzzy matrices. For multivariable processes these matrices become multi-dimensional. The inference and approximate reasoning procedure of the CRI is performed using the time-consuming Max-Min operations over these matrices. As a result the operation of the controller can handle slow and simple processes but may face difficulties to cope with real-time applications for fast and complex multivariable processes due to the huge computations required to implement their functionality. Another principal limitation on the CRI based fuzzy controllers is that they perform reasoning at the fuzzy data level (where the rules and membership functions are mapped into matrices) and can not perform reasoning at the level of fuzzy patterns as the human usually does in handling the real world situations. This makes it difficult to use these controllers to simulate the various functionalities of human thinking which usually manipulates patterns in the problem solving practice, not massive data processing. Another difficulty faced by the CRI based fuzzy controllers is that they are unable to generate scenarios and records to describe their behaviour in terms of the tasks and patterns they simulate in their operations so that they may be used to match the human behaviour involved in similar control tasks. This is due to the algorithmic rather than cognitive bases of the approximate reasoning procedure of the CRI employed in these controllers. The compatibility between the operation of fuzzy controller devices and the human thinking is an important issue required for enhancing the functional intelligence of these controllers and for simplifying the acquisition of the knowledge from experts which, in turn, shortens the time of application development.

Other relevant literature includes:

1) Rasmussen, Information processing and Human-Machine Interaction. An Approach to Cognitive Engineering. Noah-Holland, 1986.

2) Sultan, "A composition of binary and multivalued logic for the procedures organization of fuzzy expert systems," IEEE Proceedings on ISMVL, pp. 154–159, 1984.

3) Sultan, "Some considerations on systems organization for fuzzy information processing", in: Trapple L. (ed.), Cybernetics and system research, North-Holland, pp. 551–556, 1984.

4) L. Sultan, "A formal approach for the organization and implementation of fuzzy micro- processor module", Fuzzy Computing, pp. 201–221, 1988.

5) Zadeh, "Outline of a new approach to the analysis of complex systems and decision processes," IEEE Trans Systems, Man and Cybernetics., vol. SMC-3, pp. 28–44, 1973.

6) L. A. Zadeh, "The concept of a linguistic variable and its application to approximate reasoning, I and II", Inform. Sci., vol. 8, pp. 199–249 and vol. 9, pp. 301–357, 1975.

SUMMARY OF THE INVENTION

This invention is based on the premise that, in order to make their decisions, humans do not perform massive number manipulation and matrix multiplication which are computation intensive, such as how the CRI operates. Instead they perform comparisons, associations, approximations and assessments. Humans operate on, and manipulate, fuzzy patterns in making their decisions. Fuzzy patterns are the pictures which we draw in our minds about the real world events where these pictures have varying degrees of clearness and vagueness which enable us perceive these events with varying degrees of clarity (fuzziness). Evidently a more efficient, and a more intelligent, fuzzy controller design is that which operates on these same principles.

The fuzzy controller presented in this invention is designed on the basis of these premises. It is an intelligent device which operates and makes decisions by processing fuzzy patterns and by performing association and approximation and not through employing intensive matrix computations of fuzzy data. It is capable of performing the tasks of recognition, generation and assessment of validity measures of fuzzy patterns of the real world situations. The controller reasons with these patterns and their clearness degrees to arrive at its decisions. In this design the necessity to use fuzzy matrices and the time consuming Max-Min operations for approximate reasoning are eliminated. The controller becomes fast-acting real-time operating device for decision-making even in complex and multivariable applications. Its behaviour and decisions can be traced back and validated explicitly which simplifies the acquisition and optimization of the control and expert knowledge. This invention provides a systematic approach for the design of fuzzy controllers and decision making systems. In this design the controller algorithm is not amalgamated with the knowledge-base as it is the case with the CRI based fuzzy controllers. Instead the algorithm and the knowledge-base are kept separate from each other making the controller a true artificial intelligence system.

To accomplish the foregoing and other objects, and in accordance with the present invention, as described and embodied herein, a system called the Clearness Transformation Fuzzy Logic Controller (CTFLC) is presented embodying the organization, as well as, the scheme of implementation of a fuzzy controller and decision-maker system. In this system the measured process values are received as crisp data input and according to which control actions are generated in the form of crisp data as output control commands, or the input is in the form of fuzzy patterns and linguistic scenarios and the output is in the form of control commands or control action patterns and scenarios which may be utilized by the operator to enhance his/her decisions about the process operation. The fuzzy controller establishes its output through the execution of a series of knowledge based tasks such as situation recognition, situation assessment in terms of clearness degrees, pattern matching and the deduction of the control action pattern, approximate reasoning to determine the clearness assessments of the control action patterns, and defuzzification of the control pattern (if the output of the controller is required in the form of crisp data values).

The following are the distinguished functional and operational characteristics and advantages of the CTFLC system.

1. It is a system for general purpose applications capable of simulating human thinking in handling the tasks of fuzzy control and decision-making. These tasks are based on a cognitive model of fuzzy control defined in the description of the invention.

2. It is a device which operates by processing fuzzy patterns (as basic entities or portions of information) to achieve the tasks of control and decision making. It implements a set of knowledge-based tasks such as generation, recognition and assessment of the validity of fuzzy patterns and achieves approximation in the association between these patterns producing control and decision patterns together with their validity assessments. With these capabilities the CTFLC can be employed as a fuzzy controller, intelligent decision-maker and a decision support system.

3. It applies a new scheme for approximate reasoning which eliminates the necessity to use the time consuming Max-Min computation usually employed for approximate reasoning in other similar devices. Hence, the CTFLC can operate in real-time when applied for control and decision-making in multivariable systems and complex processes.

4. Its organization and operating principles are independent of the technology employed for its implementation. Various technological bases can be used to implement it while the same operation and design principles are maintained. This characteristic of the CTFLC gives it the capability of integration with other systems.

5. The controller architecture and design are such that the knowledge-base is kept separate from the algorithm. This simplifies the process of knowledge acquisition and optimization, and assists in the rapid development of applications and in the validation of the controller performance.

Other objects and advantages of the invention will be apparent from the forthcoming description and claims of the invention including the a detailed description of the drawings in which:

BRIEF DESCRIPTION OF DRAWINGS

FIG. (1) is a scheme illustrating the organization of the cognitive model of fuzzy control upon which the invention of the CTFLC system is based.

FIG. (2) is a scheme illustrating the modules and operational phases of the CTFLC system used for the embodiment of the invention.

Figure 1:
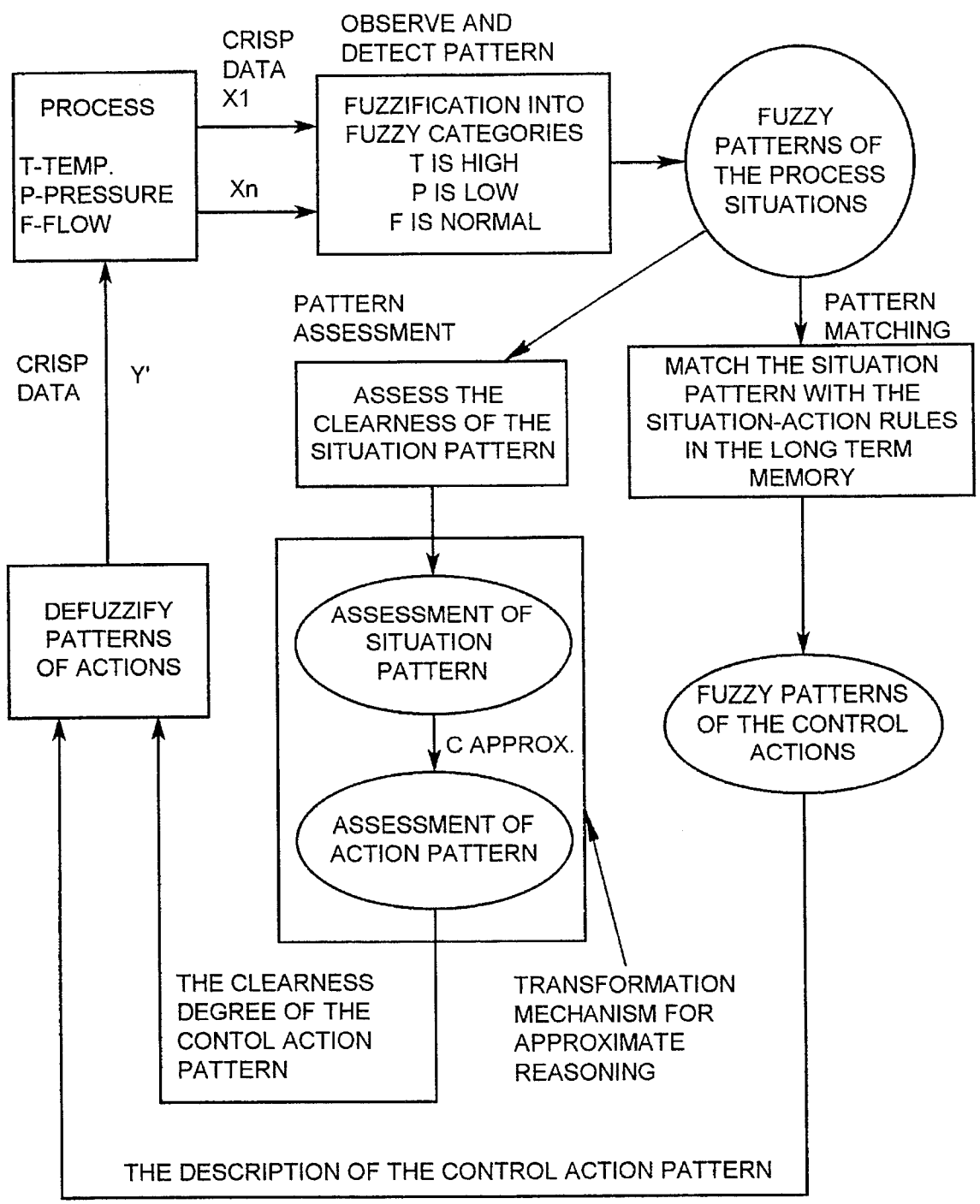

FIG. (3) is a scheme illustrating the internal architecture of the CTFLC system at the level of the operational modules and the knowledge used by each each module used for the embodiment of the invention.

FIG. (4) is an analysis in the form of tables of the characteristics of tasks of the CTFLC system in terms of input-output data, knowledge and control strategies required for their accomplishment used for the embodiment of the CTFLC system of the invention.

FIG. (5) is a functional diagram of the Fuzzifier at the level of input-output data which illustrates the interaction between the two module: Fuzzifier-I and Fuzzifier-II used for the implementation of the preferred embodiment of the invention.

FIG. (6) is a diagram showing the preferred off-line generation of the values of the thresholds of transition (TT) using the clearness distributions of fuzzy patterns used for the implementation of the Fuzzifier of the invention.

FIG. (7) is a diagram illustrating the preferred off-line generation of the values of the clearness level thresholds (CL) used for the implementation of the Fuzzifier of the invention.

FIG. (8) is a functional diagram of the Defuzzifier module at the level of input-output data used for the implementation of the invention.

FIG. (9) is a diagram illustrating the principle of counter-reflection of the clearness level of a fuzzy pattern on the elements of the domain space to infer crisp data of the control action to the process, used for the implementation of the Defuzzifier of the invention.

FIG. (10) is a table showing the preferred embodiment of the CTFLC database system for the software implementation of the invention.

DETAILED DESCRIPTION OF THE INVENTION

THE COGNITIVE MODEL OF FUZZY CONTROL

The functionality, design and operational principles of the Clearness Transformation Fuzzy Logic Controller (CTFLC) are based on the cognitive model of fuzzy control and decision-making. The general diagram of this model is presented in FIG. (1). It illustrates the basic tasks and cognitive mechanisms of a human involved in the control and decision-making procedure at a rule-based, and knowledge-based, level of behaviour. This model has been established through psychological, cognitive and experimental studies using the model of Rasmussen for supervisory control and decision-making as a frame-work. Applying this model, the tasks which the human performs when making decisions were analyzed and characterized as a loop of three phases. These are: (a) observation, detection and assessment of situation patterns, (b) control action planning and (c) action execution. The model of FIG. (1) reflects these phases. Each phase is realized through performing a set of sub-tasks. The human operator detects the states of the process variables such as FLOW, TEMPERATURE etc. from the observed (measured) data and fuzzifies them into such terms as HIGH, LOW, etc. During the fuzzification task the operator, first, draws mental pictures (i.e. patterns) of the process situations in his/her mind. Once the approximate pattern of a process situation is established, the operator, secondly, assesses the clearness of this pattern, i.e. how clear or vague (fuzzy) the situation is. The operator generates this clearness assessment based on his/her understanding and experience of the controlled process and its operation. This is usually achieved through using heuristic measures of clearness during the assessment. The more understandable and clearer the detected situation pattern is the more confident and clearer pattern of the control action the operator will generate. The operator then matches this pattern with the fuzzy pattern of the process situation that is already established in his/her long-term memory (i.e. his/her experience). The result of performing this pattern matching task is the generation of fuzzy patterns of the control actions such as "INCREASE THE FLOW SLIGHTLY", etc. which the operator applies to the process. Parallel to that the operator assesses the degree of enforcement of this action.

The model presented in FIG. (1) shows that the procedure of deducing the control action utilizes the two parallel mechanisms. The first is the pattern matching by which the operator deduces the patterns of the control actions (response to what to do). The second, which is within the basic claims of this invention, is a mechanism by which the operator deduces the assessment of the pattern of the control action (response to how clear the deduced pattern of the control action is). In essence, the second mechanism achieves a cognitive approximation leading to define the clearness and importance of the patterns of the control actions depending on the clearness assessments of the detected patterns of the process situations. Hence, the output of the deduction phase will be the pattern of the control action (by applying the pattern matching mechanism) as well as the clearness assessment of this pattern (by applying the parallel assessment mechanism). The operator then utilizes these two outputs to perform the defuzzification task by which he/she translates (defuzzifies) the fuzzy patterns of control actions into precise control commands and executes them properly in the execution phase.

The basic results obtained from this cognitive model are the definition of the tasks of fuzzy control, the interpretation of these tasks through the use of the notion of fuzzy patterns and their clearness assessments, and the identification of the approximate reasoning performed by the parallel assessment mechanism. In FIG. (1), the ($C_{approx}$) symbol which appears in the approximate reasoning block refers to the approximate degree of "strength" or "weakness" of the situation pattern (clearness) which is used by the assessment mechanism to produce degrees of strength of the patterns of control actions. The approximate reasoning mechanism is formulated in this invention as the Clearness Transformation Rule of Inference (CTRI) and the fuzzy controller developed on its basis is called the Clearness Transformation Fuzzy Logic Controller (CTFLC).

The tasks of the CTFLC are defined based on this cognitive model and summarized in the following order: Fuzzify the measured values of the process variable to Generate and Assess the fuzzy patterns of the process situations→Perform pattern matching to infer the fuzzy patterns of control actions→Apply the parallel assessment mechanism to Assess the patterns of control actions→ Defuzzify the deduced patterns of the control actions→ Execute the deterministic control actions.

It is within the basic claims of this invention that the CTFLC is a system capable of handling the tasks and mechanisms defined by the cognitive model of fuzzy control outlined in the forgoing description of the invention. In essence, the CTFLC is a cognitive expert system device which is capable of simulating the human behaviour in performing the tasks of this model.

THEORETICAL BASES

Fuzzy controllers are designed to operate as follows: receive measurement data (which are crisp data) from the controlled process, fuzzify this data to obtain a picture (pattern) of the process state, take decisions as to what action is required to be performed on the process, defuzzify this action to obtain crisp data command, send this crisp data command to regulate the controlled process.

The CRI based fuzzy controllers implement these tasks as follows: fuzzify by mapping a crisp data into a vector. To take decision (i.e. to perform the inference) the control rules and membership functions should be amalgamated and mapped into a matrix (before hand) and the decision is made by performing special operations called the Max-Min operations between the above vector and this matrix. As a result of these operations another vector is generated. To obtain the output of the controller in the form of crisp data many such vectors are generated and some operations are performed on these vectors to obtain an average value which will be the crisp data command going to the controlled process.

This procedure implements the tasks of the fuzzy controller by working on fuzzy data where fuzzy concepts and categories are represented by data in the form of vectors and matrices. Hence the term "fuzzy data processing".

The CTFLC controller presented in this invention performs the above tasks not by fuzzy data processing but by fuzzy pattern processing. In this design, the fuzzifier produces fuzzy patterns rather than data vectors. These fuzzy patterns are represented by names or symbols. The inference procedure consists of two parallel operations, fuzzy rule inferencing and clearness assessments. The defuzzification produces exact output data and does not use averaging or approximation. The design and operation of the controller is directly based on cognitive foundations. It is a new look from the angle of cognitive conception which relates the various functionalities of the fuzzy controller more towards the human perception of the real world events. The CTFLC fuzzy controller system uses a set of new developments such as the fuzzy pattern as a basic entity which is manipulated during operation, the use of specific measures to assess the clearness degree of a fuzzy pattern in terms of the "strength" and "weakness", and the use of a reasoning mechanism which differentiates between the detected process patterns during on-line operation and the patterns residing in the controller knowledge-base. These and other developments which are relevant to the understanding of the invention are summarized in the next description of the invention.

The Clearness Degree

The clearness degree characterizes the assessment of the clearness measure (fuzziness) of a fuzzy pattern. It is a measure of how close this pattern is to being absolutely clear, partially clear (fuzzy) or absolutely dim (false). Fuzzy patterns are pictures of the real world situations with varying degrees of clearness. These patterns can be assessed using clearness measures built in the closed interval [0, 1]. A pattern with a clearness degree equal to 1 is the clearest and a pattern with clearness degree equal to zero is the dimmest. For example, if we define the limits of high temperature to be between 50°–100° C., then the temperature 100° C. will have a clearness degree of 1, while the temperature 50° C. will have the lowest clearness degree of 0. In other words if we describe the temperature of 50° C. as high, it will be hardly true according to the above limits.

To define the clearness degree assume that PA and PB denote fuzzy patterns which would have the syntax as follows:

PA: Lx is A

PB: Ly is B and (PA→PB) is a fuzzy implication which is interpreted syntactically by the fuzzy statement:

IF Lx is A THEN Ly is B where:

Lx and Ly are linguistic variables defined over the universes of discourse X and Y, respectively.

A and B are fuzzy subsets of the universes X, Y, respectively. We note that A and B are linguistic values of Lx and Ly as formulated by Zadeh (1975).

The clearness degree of the fuzzy pattern is evaluated when the variable (e.g. Lx) , with which a fuzzy pattern (such as PA) is associated, is substituted by a measured value, (such as xi). In this invention we use three measures;

C, I and Γ to estimate the clearness degree of a fuzzy pattern. C is called the Clearness Degree, denoted as C(PA), I is called the Integrated Clearness Degree and denoted as I(PA) and Γ is the Clearness Distribution, denoted as Γ(PA), for a fuzzy pattern PA. FIG. (5) illustrates the concept of these measures in the assessment of fuzzy patterns.

The C- measure is used to assess the clearness degree of a fuzzy pattern and formulated as follows. The fuzzy pattern (PA: Lx is A) will be associated with a clearness degree, denoted C(PA) when Lx is substituted by a value $x \in X$, which may be represented as follows:

$$C: PA \to [0,1] \| \text{ for } L_{xi} = x_i$$

or:

$$C(PAi) = C(xi \text{ is } A) = \alpha k$$

where: $\alpha k$ - is a clearness level in the interval [0, 1]. This interval is divided into a finite set of n clearness-levels $\alpha i \in [0, 1]$ with:

$$\alpha i = \begin{cases} \alpha i = 0 & \text{(absolutely unclear, i.e. false)} \\ \epsilon(0, 1) & \text{for } (\alpha 2, \ldots, \alpha n - 1) \quad \text{(partially clear)} \\ \alpha n = 1 & \text{(absolutely clear)} \end{cases}$$

For the I measure: The clearness degree of a complex pattern (a complex pattern consists of many elementary patterns, such as the fuzzy controller control rules) is calculated as follows:

1. $I\,min = \underset{i}{Min}\ \{C(PA'i)\}$

2. $I\,max = \underset{i}{Max}\ \{C(PA'i)\}$

3. $I\,av = \dfrac{\sum\limits_{i}^{n} C(PA'i)}{n}$

Other formulas such as probability, statistical etc. can also be employed.

For the Γ- measure: The fuzzy pattern (PA: Lx is A) may be represented using the notation of "clearness distribution" Γ(PA) as follows. The clearness distribution is generated by assigning a clearness degree for each measured value x of the universe of discourse X of the variable Lx. The clearness distribution Γ(PA) describes the clearness values of PA for different values of $x \in X$ of Lx. Thus for the statement: Lx is A, if Lx takes the values (x1, x2, . . . , xn) $\in X$, and the clearness degrees for these values are given by:

$$C(PAi) = C(xi \text{ is } A) = \alpha l \text{ where } i=1,2,\ldots,n, \text{ and } \alpha l \in [0,1],$$

then the set $\alpha l \in [0, 1]$ is the clearness distribution Γ(PA) of the fuzzy pattern PA.

Generally the Γ measure is used to assess the total clearness distribution of a fuzzy pattern for all the possible values of the linguistic (process) variable within the range of the fuzzy pattern, and is given by:

$$\Gamma(PA) = (C_1(PA), C_2(PA), \ldots, C_n(PA))$$

These two measures are used by the CTFLC to assess the clearness of any complex fuzzy pattern described formally as a well formulated formula (wff) of the logic of fuzzy predicates.

The Approximate Reasoning Mechanism

While the CRI performs inferencing (approximate reasoning) by using vectors and matrices, the approximate reasoning presented in this invention, the Clearness Transformation Rule of Inference (CTRI), comprises of two parallel mechanisms. These are the "Pattern Matching" and the "Clearness Transformation" mechanisms. The output of the pattern matching mechanism is the control action pattern and the output of the transformation mechanism is the clearness degree of the control action pattern. The transformation mechanism assigns the clearness degree of the detected pattern of the process situation (observation) to the pattern of the control action. This mechanism follows the approximate reasoning process that the human operator performs in the pattern matching activity which is reflected in the cognitive model of fuzzy control mentioned in the foregoing description of the invention and illustrated in FIG. (1).

To state the CTRI formally, the general form of a Situation-Action rule of the fuzzy controller is as follows:

IF< Pattern of Process Situation> THEN <Pattern of Control Action> or $$\text{IF } PA1 \text{ and } PA2 \ldots \text{ and } PAn \text{ THEN } PBj \quad (1)$$

where:

PAi - are fuzzy patterns of the general form "$Lx_i$ is $A_i$" used to describe the patterns of the process variables (process situation), and i=1, 2, . . . , N.

PBj - are fuzzy patterns of the general form "Lyj is Bj" used to describe the patterns of control actions, j=1, 2, . . . , M.

Now, given two fuzzy patterns P1 and P2, where:

P1: is a pattern of the fuzzy controller rule of expression (0, i.e.

P1=<Situation Pattern→Control Action Pattern>.

P2: is a pattern of a process situation given with its clearness distribution (Γ), i.e.

P2=<Situation Pattern> and Γ(P2).

If these two patterns are applied to the CTRI, the CTRI will deduce:

P3: a pattern of the control action with an assessment of its clearness distribution equal to that of P2, i.e.

P3=<Pattern of the Control Action> with Γ(P3)=Γ(P2).

Using the symbolic notations of the Logic of Fuzzy Predicates, the CTRI mechanism is stated as follows:

Given two fuzzy patterns (Well Formulated formula of the logic of fuzzy predicates):

$$\begin{array}{ll} P1: G \to H & (2) \\ \underline{P2: G' \text{ and } \Gamma(G')} & \\ \text{Deduce:} \quad P3: H' \text{ with } \Gamma(H') = \Gamma(G'). & \end{array}$$

where: G, H and G→H are patterns of the fuzzy controller rules specified by the clearness distributions Γ(G) and Γ(H); G' and H' are measurement patterns of G and H, respectively.

Since the clearness distribution is the collection of clearness degrees, expression (2) is also applicable when we replace Γ by C.

The application of the CTRI for approximate reasoning in the CTFLC offers many advantages to this device. First it gives it the cognitive inference property in deducing the clearness degrees of the inferred patterns of the control actions. This enables it to produce the patterns of decisions together with their clearness degrees (validity). The clearness degree of the fuzzy pattern during on-line operation may exceed the clearness degree of the pattern residing in the knowledge-base of the controller (the experience). This feature gives the CTFLC higher intelligence than other designs of fuzzy controllers which do not possess this capability. Secondly, the CTRI performs reasoning at the level of fuzzy pattern processing. This feature makes it possible to compare the behaviour of the CTFLC with the human expert involved in decision-making procedures in the same domain. Having such advantages makes these devices more compatible with the human behaviour and act as a support to this behaviour.

DETAILED DESCRIPTION OF THE PREFERRED EMBODIMENT OF THE CTFLC

The architecture and operational phases of the CTFLC system for handling the tasks of the cognitive model of fuzzy control are illustrated in FIG. (2). This system consists of the following modules: The Fuzzifier, The Controller Pattern Matching Mechanism, The Parallel Assessment Mechanism for Approximate Reasoning and the Defuzzifier. The controller operates in a cycle which consists of four phases: Fuzzification, Rule Selection and Inference, Parallel Approximate Reasoning and Defuzzification. The flow of data and control between these four modules is coordinated by a Control and Inference module. The internal organization of the fuzzy controller is presented in FIG. (3). The knowledge-base is organized so that each module of the controller is attached to the portion of knowledge it requires to access in order to perform its task. This organization reflects the design of a truly artificial intelligence system whereby each of its modules has its own distinct knowledge-base, making the whole system transparent to changes in the various knowledge bases and to the effects of these changes. This has a paramount importance in the simplification of generating and optimizing (tuning) the various knowledge bases for each task.

An overall account of the operation of the controller is illustrated in FIG. (2) and summarized as follows. The controller receives crisp data which represents the measured, or calculated, values of the controlled process variables. This data is channeled to the Fuzzifier module which performs two operations on it. First it generates the description of the fuzzy pattern of each process variable. Second it assesses the clearness degrees of the generated patterns (estimated over the interval [0, 1]). The first output of the Fuzzifier (the situation fuzzy patterns) are channeled to the Pattern Matching module to deduce the fuzzy pattern of the control action using forward chaining. The second output of the fuzzifier, which is the clearness degrees of the situation patterns, is channeled to the assessment mechanism module. This module selects the minimum of the clearness degrees it receives. This minimum clearness degree is assigned to the pattern of control action. Finally, the Defuzzifier module receives the patterns of the inferred control action (generated by the Pattern Matching Mechanism) and their clearness degree (generated by the assessment Mechanism) and deduces the crisp data (command) of the control actions. This command is then sent to regulate the process.

Each of the above tasks of the CTFLC is analyzed in terms of the Input/Output relation, portion of knowledge needed and the appropriate reasoning model used to achieve it. The results are summarized in Tables 1, 2 and 3 of FIG. (4). These tables cover the data, knowledge and control strategies required by the CTFLC system to perform each task.

Unlike the fuzzifier of the CRI based fuzzy controller which generates vectors for the controller to operate on to produce its output using multi-dimensional matrices, the fuzzifier of the CTFLC controller generates fuzzy patterns which are acted on by the controller directly to produce its output. The controller here processes the fuzzy patterns rather than fuzzy data, which makes it more in line with truly simulating human decision making.

Next we describe the design and operating phases of the CTFLC in some details. During the Fuzzification Phase, the process measurement crisp data $(x_1, x_2, \ldots, x_N)$ are fuzzified to generate the fuzzy patterns $(PA'_1, PA'_2, \ldots, PA'_N)$ of the process situation (observation). The generated situation pattern is matched with the controller pattern $(PA_1, PA_2, \ldots, PA_N)$ which is the LHS of the controller rules. This fuzzification is achieved through the generation of the clearness degree assessment $C(PA'_i)$ of the measured value $x_i$ for each fuzzy pattern $PA'_i$ using their clearness degrees as follows. Since, in general, there is a finite set of fuzzy patterns (and their clearness degrees) associated with each linguistic (process) variable $Lx_i$, the Fuzzifier selects the fuzzy pattern $PA'_i$ which has the maximum clearness degree value (e.g. $\alpha_i$ max) for the crisp data of the process measurement xi. The fuzzy patterns $(PA'_1, PA'_2, \ldots, PA'_N)$ which are generated in this way for N variables constitute the detected fuzzy pattern of the process situation (this is a complex pattern made of many elementary patterns). The Fuzzifier also generates $\{C(PA'_i)max\}$ which is the set of clearness degree measures $<\alpha_1 max, \alpha_2 max, \ldots, \alpha_n max>$, where: $\alpha_n max \in [0, 1]$. This set constitutes the clearness degree of the fuzzy pattern of the process situation.

In more details, FIG. (5) shows the block diagram of the Fuzzifier Module. The input to the Fuzzifier is the crisp data $(x_1, \ldots, x_N)$ where each $x_i$ represents the current measurement value of an input variable $Lx_i$, i=1, ..., N. The output is two components. The first is a set of fuzzy patterns of the process situation such as $(PA'_1, \ldots, PA'_n)$. The second is a set of clearness degrees $(C(PA'_1)max, \ldots, C(PA'_n)max)$ which are the maximum clearness degrees of the fuzzy patterns. These two outputs are produced by two rule-based modules: Fuzzifier-I and Fuzzifier-II, respectively. They operate in two cycles so that Fuzzifier-I (cycle 1) generates the fuzzy pattern $(PA'_i)$. This fuzzy pattern together with the measured value of the process variable serve as inputs to Fuzzifier-II to begin cycle 2 in which the clearness degree value $C(PA'_i)max$ is generated. For N variables these two cycles are repeated N times.

To achieve the tasks of fuzzifier-I we compute the intersection points between every two adjacent clearness degree curves of the fuzzy patterns that are associated with each linguistic (process) variable. We refer to these intersections points as the thresholds of Transition (TT). In essence, these TT points indicate the existence of a transition between the fuzzy patterns $(PA_h)$, (h=1, 2, ... H), which describe the state of each process variable $Lx_i$ (i=1, 2, ..., N). FIG. (6) shows the derivation of the TT values for the variable $Lx_i$ which has three (H=3) fuzzy patterns: PLOW, PNORMAL and PHIGH. In this figure two of these thresholds are projected on the domain space X (x-axis) and denoted as:

$TT_{L,N}$=The Threshold of Transition between $\Gamma(PLOW)$ and $\Gamma(PNORMAL)$ $TT_{N,H}$=The Threshold of Transition between $\Gamma(PNORMAL)$ and $\Gamma(PHIGH)$.

The Fuzzifier recognizes the fuzzy pattern $PA_h$ which describes the current state of the variable $Lx_i$ by deciding the interval (between two TT points) to which the value $x_i$, which is acquired from the process, belongs. This approach facilitates the implementation of a one-to-one mapping so that for each measured value $x_i$ there is only one pattern $PA_i$ which describes the current state of the variable $Lx_i$. This procedure can be implemented simply by comparing the value of xi with the values of the thresholds (TT). The following generic rule is employed to implement this procedure:

IF $TTh-1,h \leq xi < TTh,h+1$ THEN the Fuzzy Pattern is $PA_h$ (3)

where: $TTh-1, h$ and $TT h,h+1$ refer to the values of the thresholds of transition (TT) between the fuzzy patterns $PA_{h-1}, PA_h$ and $PA_h, PA_{h+1}$, respectively. For the example illustrated in FIG. (6), three such rules are derived. They are:

| R1: | IF | 0 | $\leq$ | xi | $< TT_{L,N}$ | THEN $P_{LOW}$ |
| R2: | IF | $TT_{L,N}$ | $\leq$ | xi | $< TT_{N,H}$ | THEN $P_{NORMAL}$ |
| R3: | IF | $TT_{N,H}$ | $\leq$ | xi | | THEN $P_{HIGH}$ |

Similar rules can be derived for all process variables.

The on-line operation of Fuzzifier-I to generate the fuzzy patterns is accomplished by matching the crisp data xi coming from the process with these rules. The result of this matching is the set of fuzzy patterns $(PA'_1, PA'_2, \ldots, PA'_N)$ which constitute the description of the situation pattern. We note that these rules also generate fuzzy patterns $PA'_i$ which have maximum clearness degrees $C(PA'_i)$ max for a given process measurement $x_i$, i=1, 2, ..., N, (these patterns are generated as best describing the state of process variables).

Next we describe the design of Fuzzifier-II which generates the clearness degrees of the fuzzy patterns. These are the set of the clearness degrees $(C(PA'_1)max, C(PA'_2)max, \ldots, C(PA'_N)max)$, which are assessed over the interval [0, 1]. For Fuzzifier-II to operate, the interval [0, 1] is descretized and projected on the domain space $X_i$ of the clearness distribution $\Gamma(PA_i)$ for each fuzzy pattern. The values obtained are referred to as the "Clearness level Thresholds" (CL). FIG. (7) shows an example of the projection of five clearness thresholds $(\alpha_1, \ldots, \alpha_5)$ on the domain of $\Gamma(PHIGH)$. The result is five clearness threshold values $(CL_1, \ldots, CL_5)$ on $X_i$ (CL should not be confused with the thresholds of transition TT between the clearness degrees defined earlier). These threshold points are used to generate $C(PA'_i)max$ by employing simple comparison between the measured value $x_i$ and these CL values to decide to which interval (between these points) the data $x_i$ belongs. The detected intervals indicate values of clearness thresholds in the interval [0, 1]. The rules employed by Fuzzifier-II to perform this task have the following generic form:

IF The FP is $PA_h$ AND $CL_k \leq x_i < CL_{k+1}$ THEN $C(PA_h) = \alpha_k$ (4)

where: FP stands for "Fuzzy Pattern".

As an example, the following rules are generated for $\Gamma(PLOW)$ of FIG. (7).

R1: IF The FP is PHIGH and $x_i < CL_1$ THEN C(PHIGH)=$\alpha_0$

R2: IF The FP is PHIGH and $CL_1 \leq x_i < CL_2$ THEN C(PHIGH)=$\alpha_1$

R3: IF The FP is PHIGH and $CL_2 \leq x_i < CL_3$ THEN C(PHIGH)=$\alpha_2$

R4: IF The FP is PHIGH and $CL_3 \leq x_i < CL_4$ THEN C(PHIGH)=$\alpha_3$

R5: IF The FP is PHIGH and $CL_4 \leq x_i < CL_5$ THEN C(PHIGH)=$\alpha_4$

R6: IF The FP is PHIGH and $CL_5 \leq x_i$ THEN C(PHIGH)=$\alpha_5$

Evidently, the number of rules of Fuzzifier-II for each fuzzy pattern depends on the number of clearness thresholds used to descretize the clearness degree of the pattern. The number of clearness thresholds can be chosen as large as desired depending on the required accuracy without the fear of increasing the computation time considerably.

Next we describe the Rule Selection phase. During this phase the appropriate rule is selected by matching the generated pattern of the process situation $(PA'_1, PA'_2, \ldots, PA'_N)$ with the pattern $(PA_1, PA_2, \ldots, PA_N)$ of the controller rules. The RHS of the matching rule is activated which describe the pattern(s) $PB_j$ of the control action(s). The Controller rules describe the association between fuzzy patterns of the process situations and the control actions. The control protocol of the CTFLC system is composed of a finite set of fuzzy rules of the form:

IF <Pattern of Process Situation> THEN <Pattern of Control Action>

Both the pattern of the "Process Situation" and the pattern of the "Control Action" are defined in the general form of a Situation-Action rule of the control protocol of equation (1).

Next we describe the Approximate Reasoning Phase in which the Parallel mechanism scheme is applied. This scheme computes a value from the clearness degrees <$\alpha_1$ max, $\alpha_2$ max, ..., $\alpha_n$ max> generated by the fuzzifier and assigns it to the inferred pattern of the control action. The designer can choose this value to be the minimum, maximum or the average as described in the forgoing description of the invention under the section of clearness degree.

However, in this invention the CTRI uses the minimum value given below:

$$C(PB'_j) = Min\{C(PA'_1)max, C(PA'_2)max, \ldots, C(PA'_N)max\},$$

or, $$C(PB'_j) = Min(\alpha_1 max, \alpha_2 max, \ldots, \alpha_n max) \quad (5)$$

This clearness degree carries the information leading to the computation of the exact value of the control command signal.

In the Defuzzification Phase the inputs to the Defuzzifier are the pattern of the control action $PB'_j$ and its computed clearness degree $C(PB'_j)$. The output of the defuzzifier is the crisp data value y' of the control variable $Ly_j$. The Defuzzifier infers this value by reflecting the value of $C(PB'_j)$ on the clearness degree curve (the y-axis) and obtaining the result using its projection on the domain space (the x-axis).

Next we describe the defuzzifier operation in some details. The Defuzzifier Module (see FIG. 8) receives the pattern of the control action $PB'_j$ and its clearness degree value $C(PB'_j)$ as inputs. The output is the crisp data y' which represents the control command going to the controlled process. The defuzzification is achieved by counter reflecting the $C(PB'_j)$ value on the clearness degree axis $\Gamma(PB'_j)$ and projecting it onto the domain space (x-axis) to infer the crisp value y' for the control variable Lyj. The clearness degree curve of the action pattern is descretized into K-clearness levels, $\{\alpha k\}$, k=1,2, ..., K. These clearness levels are projected on the variable domain space (the x-axis) so that each level is associated with a set of values $\{yj\}$ of this domain. A particular variable value y' is inferred when the value of $C(PB'_j)$ refers to a certain clearness level. This task is achieved by using the following generic rule:

IF Control Pattern is $PBj$ AND $\alpha_k \leq C(PB'_j) < \alpha_{k+1}$ THEN $yk \leq y' < yk+1$ (6)

where, the value of y'j is generated from the boundaries [yk, yk+1].

Hence, the rules employed by the Defuzzifier module establish an association between the value of $C(PB_j)$ and the relevant value y' of the control variable. FIG. (9) illustrates how six such rules are derived when $C(PB_j)$ is descretized into six levels. The six rules for this example are:

IF The pattern is PB'$_j$ and $0 \leq C(PB'_j) < \alpha 1$ THEN $y' \leq y1$

IF The pattern is PB'$_j$ and $\alpha 1 \leq C(PB'_j) < \alpha 2$ THEN $y1 \leq y' \leq y2$ IF The pattern is PB'$_j$ and $\alpha 2 \leq C(PB'_j) < \alpha 3$ THEN $y2 \leq y' \leq y3$ IF The pattern is PB'$_j$ and $\alpha 3 \leq C(PB'_j) < \alpha 4$ THEN $y3 \leq y' \leq y4$ IF The pattern is PB'$_j$ and $\alpha 4 \leq C(PB'_j) < \alpha 5$ THEN $y4 \leq y' \leq y5$ IF The pattern is PB'$_j$ and $\alpha 5 \leq C(PB'_j)$ THEN $y5 \leq y'$ The number of discrete levels is accuracy dependent, i.e. for more accurate control commands the number of discrete levels is increased to any required limit.

The CTFLC is designed to have a special database module which provides a complete record of the behaviour of the controller at each phase of operation (FIG. 10). At the beginning of each control cycle, the database contains only the current values of process variables. By the completion of the fuzzification phase, for example, it will contain a list of the fuzzy patterns which describe the process situation and the clearness degrees of these patterns. At the completion of the control cycle, the information in this database serves as an excellent record for the implementation of a backtracking chronological explanation of the controller operation and decision.

Figure 2:
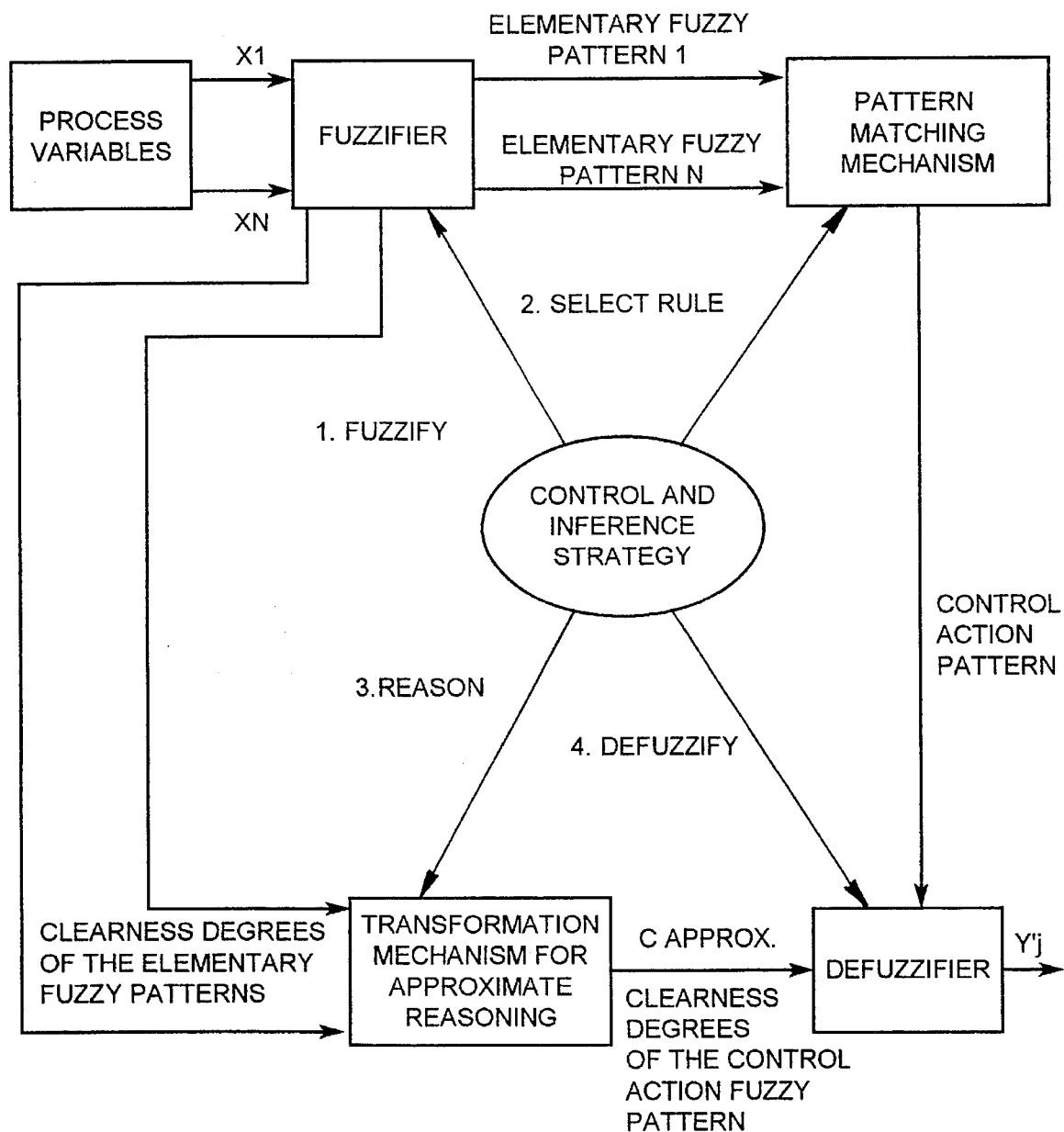
Figure 3:
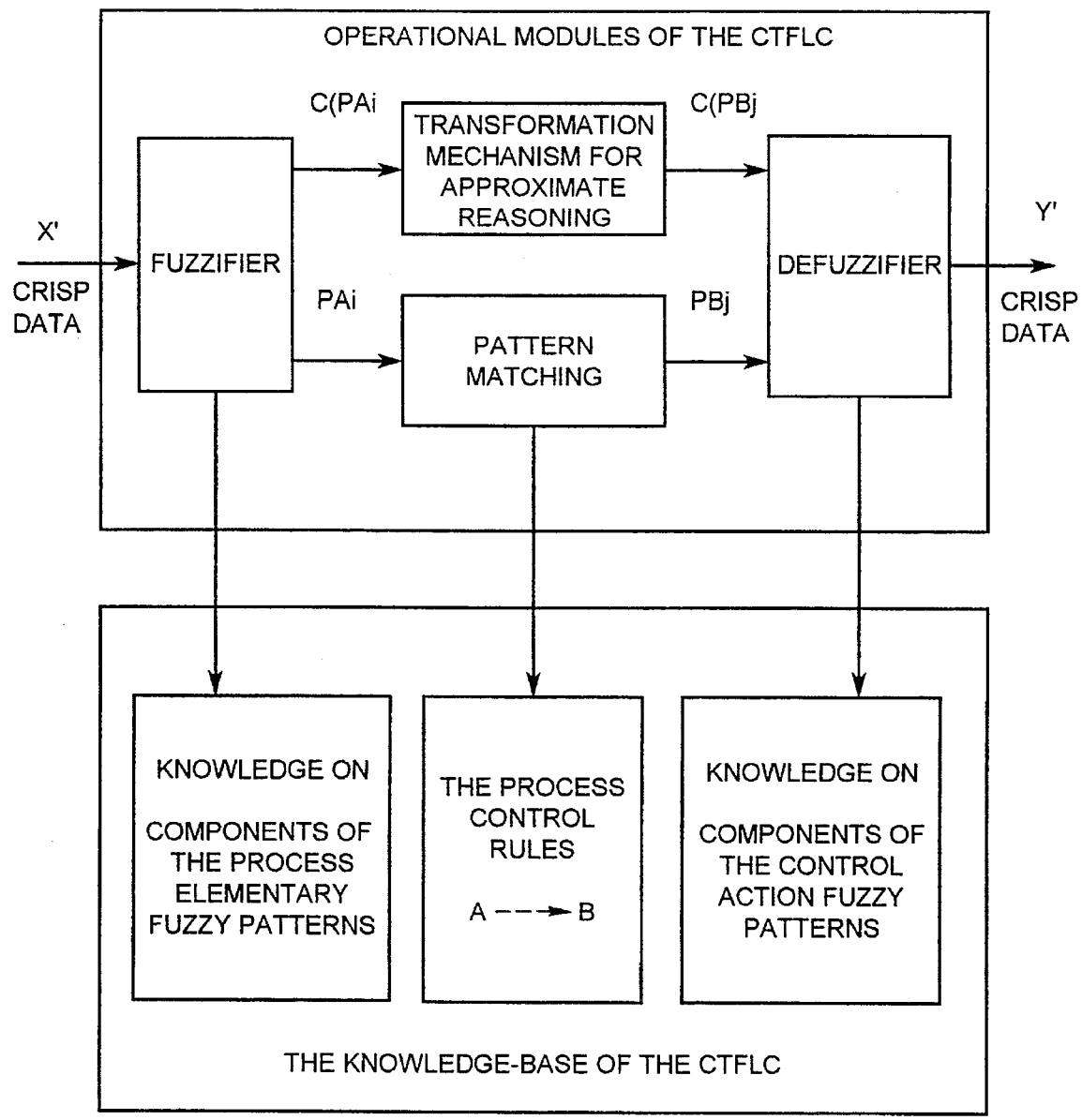
Figure 5:
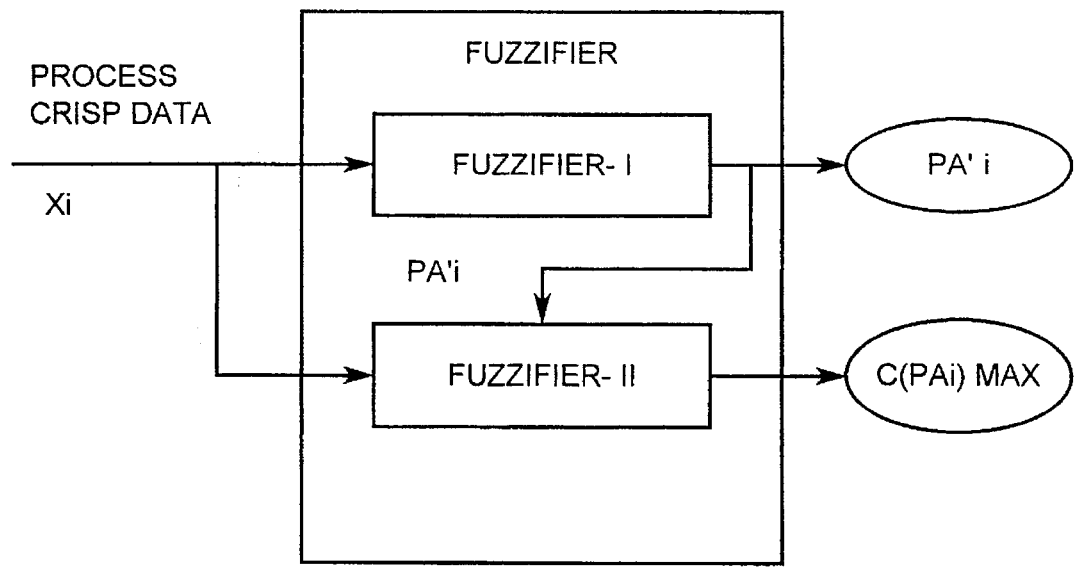
Figure 6A:
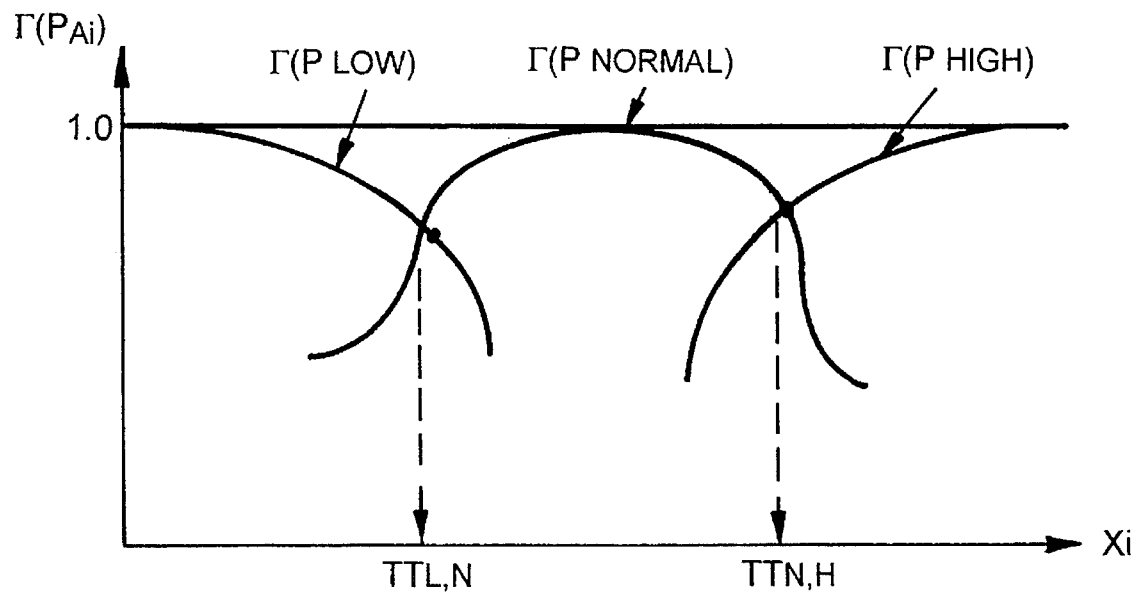
Figure 6B:
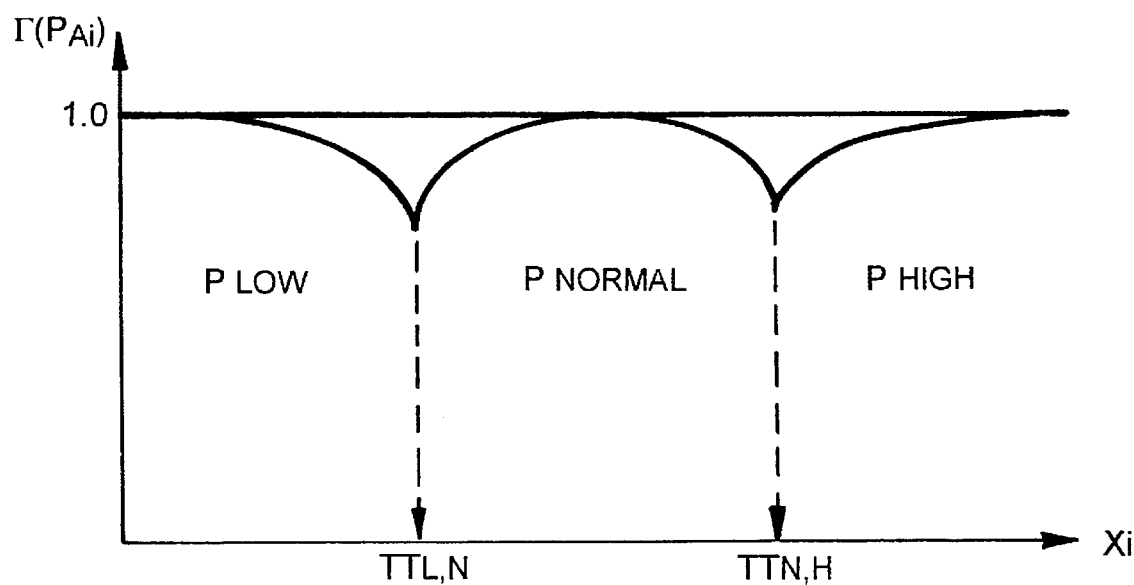
Figure 7:
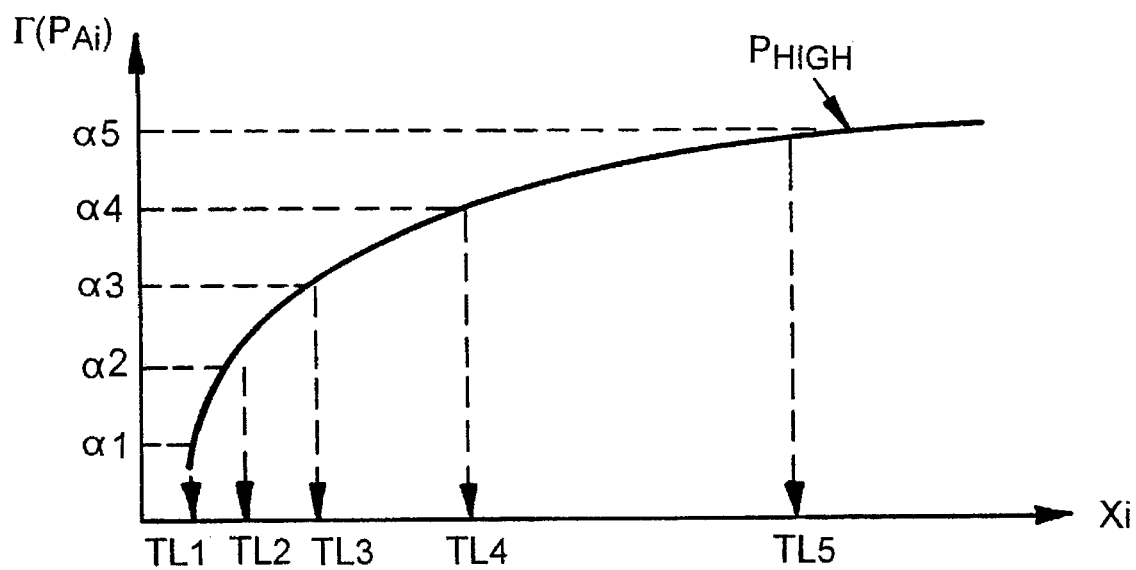
Figure 9:
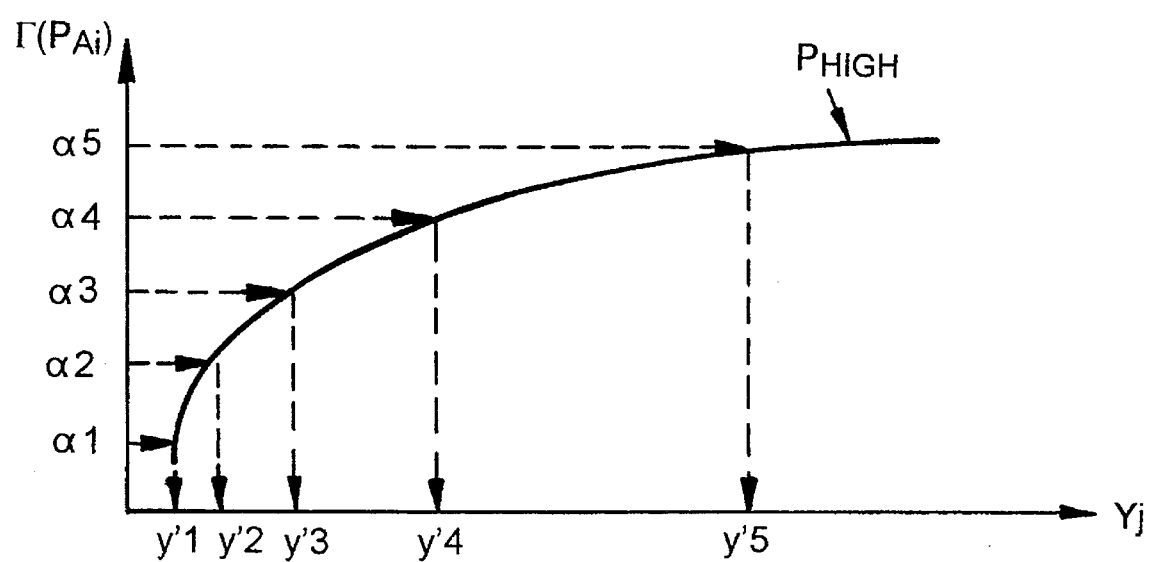

The controller operation and control described so far are coordinated by a Control and Inference Module (see FIG. 2). This module is the control core of the system. It coordinates the operations of the modules and the succession of the four phases of the controller. It applies the appropriate reasoning strategy to execute each phase of the controller in the appropriate sequence so that the full controller cycle is realized. It also arranges access to the knowledge required to perform each task. The module also updates the controller database with the data obtained through the execution of each phase.

The embodiments of the invention in which an exclusive property or privilege is claimed are defined as follows:

1. A fuzzy logic decision-maker for receiving input signals, utilizing data in a knowledge-base and, based on said input signals and said data, providing output signals in order to provide knowledge-based decision making, said knowledge-base of the type containing fuzzy rules comprising representations of fuzzy patterns of consequents (THENs) and representations of fuzzy patterns of antecedents (IFs);

clearness distributions comprising collections of representations of clearness degrees, said clearness degrees defining cognitive measures which assess the fuzziness of fuzzy patterns, and representations of thresholds of transitions, said thresholds of transitions being the intersection points of every two adjacent clearness distributions, said fuzzy logic decision-maker comprising:

a fuzzifier comprising first means for mapping said input signals into representations of input fuzzy patterns and second means for mapping said input signals into representations of input clearness degrees of said input fuzzy patterns, said input clearness degrees being valued in the interval of zero to one, where zero represents "absolutely unclear" ("absolutely false") and one represents "absolutely clear" ("absolutely true");

pattern matching and rule selection means for receiving said representations of input fuzzy patterns from said first means of said fuzzifier and, responsive thereto, for selecting one rule from said knowledge-base, and for generating representations of output fuzzy patterns based on the consequent (THEN) portion of said rule;

approximate reasoning means for receiving said representations of input clearness degrees from said second means of said fuzzifier and for mapping said representations of input clearness degrees into a representation of an output clearness degree, said approximate reasoning means operating in parallel with said pattern matching and rule selection means; and defuzzifier means for receiving said representations of output fuzzy patterns from said pattern matching and rule selection means and for receiving said representation of an output clearness degree from said approximate reasoning means and for mapping said representations of output fuzzy patterns and said representation of an output clearness degree into said output signals.

2. The fuzzy logic decision-maker of claim 1 in which said fuzzifier first means comprises means to compare said input signals with said representations of thresholds of transitions contained in said knowledge-base such that each of said input signals is mapped into a corresponding representation of a fuzzy pattern.

3. The fuzzy logic decision-maker of claim 2 in which said fuzzifier second means receives said input signals and said representations of input fuzzy patterns generated by said fuzzifier first means from said input signals, said fuzzifier second means comprising means for selecting a clearness distribution from said knowledge-base corresponding to each of said input fuzzy patterns, and means for utilizing each said clearness distribution, and the input signal utilized by said fuzzifier first means in generating the representation of the fuzzy pattern which corresponds to said clearness distribution, to generate a representation of a clearness degree.

4. The fuzzy logic decision-maker of claim 3 wherein said clearness distribution is mapped into a pre-determined number of discrete clearness degrees.

5. The fuzzy logic decision-maker of claim 3 wherein each clearness distribution has an x-axis representing the range of input variable values for the fuzzy pattern which is associated with the input variable and which corresponds with said each clearness distribution and a y-axis representing clearness degrees and wherein said means for utilizing each said clearness distribution, and the input signal utilized by said fuzzifier first means in generating the representation of the fuzzy pattern which corresponds to said clearness distribution, locates said input signal on the x-axis of said clearness distribution and projects said input signal onto the y-axis of said clearness distribution in order to obtain the clearness degree of said input fuzzy pattern for said input signal.

6. The fuzzy logic decision-maker of claim 3 wherein said defuzzifier means comprises means for selecting a clearness distribution from said knowledge-base corresponding to each of said output fuzzy patterns, and means for utilizing each said output fuzzy pattern clearness distribution to map said representation of an output clearness degree to a value for one of said control signals.

7. The fuzzy logic decision-maker of claim 6 wherein said output fuzzy pattern clearness distribution is mapped into a pre-determined number of clearness degrees.

8. The fuzzy logic decision-maker of claim 6 wherein each clearness distribution has an x-axis representing the range of output variable values for the fuzzy pattern which is associated with the output variable and which corresponds with said each clearness distribution and a y-axis representing clearness degrees and wherein said means for utilizing each said output fuzzy pattern clearness distribution to map said representation of an output clearness degree to a value for one of said control signals comprises means for locating said output clearness degree on the y-axis of said output fuzzy pattern clearness distribution and for projecting said output clearness degree onto the x-axis of said output fuzzy pattern clearness distribution.

9. The fuzzy logic decision-maker of claim 1 wherein said representations of input fuzzy patterns comprise indices, names, or addresses of said input fuzzy patterns and wherein said representations of output fuzzy patterns comprise indices, names, or addresses of said output fuzzy patterns.

10. The fuzzy logic decision-maker of claim 1 wherein said means for mapping of said approximate reasoning means comprises means for determining the minimum value of input clearness degrees represented by said representations of input clearness degrees and for assigning said minimum value to the output clearness degree represented by said representation of an output clearness degree.

11. The fuzzy logic decision-maker of claim 1 wherein said means for mapping of said approximate reasoning means comprises means for determining the maximum value of input clearness degrees represented by said representations of input clearness degrees and for assigning said maximum value to the output clearness degree represented by said representation of an output clearness degree.

12. The fuzzy logic decision-maker of claim 1 wherein said means for mapping of said approximate reasoning means comprises means for determining the average value of input clearness degrees represented by said representations of input clearness degrees and for assigning said average value to the output clearness degree represented by said representation of an output clearness degree.

13. A fuzzy logic controller for receiving input signals from a process, utilizing data in a knowledge-base and, based on said process input signals and said data, providing output control signals to said process in order to provide knowledge-based control of said process, said knowledge-base of the type containing fuzzy rules comprising representations of fuzzy patterns of consequents (THENs) and representations of fuzzy patterns of antecedents (IFs);

clearness distributions comprising collections of representations of clearness degrees, said clearness degrees defining cognitive measures which assess the fuzziness of fuzzy patterns, and representations of thresholds of transitions, said thresholds of transitions being the intersection points of every two adjacent clearness distributions, said fuzzy logic controller comprising:

a fuzzifier comprising first means for mapping said process input signals into representations of input fuzzy patterns and second means for mapping said process input signals into representations of input clearness degrees of said input fuzzy patterns, said input clearness degrees being valued in the interval of zero to one, where zero represents "absolutely unclear" ("absolutely false") and one represents "absolutely clear" ("absolutely true");

pattern matching and rule selection means for receiving said representations of input fuzzy patterns from said first means of said fuzzifier and, responsive thereto, for selecting one rule from said knowledge-base, and for generating representations of control action fuzzy patterns based on the consequent (THEN) portion of said rule;

approximate reasoning means for receiving said representations of input clearness degrees from said second means of said fuzzifier and for mapping said representations of input clearness degrees into a representation of a control action clearness degree, said approximate reasoning means operating in parallel with said pattern matching and rule selection means; and defuzzifier means for receiving said representations of control action fuzzy patterns from said pattern matching and rule selection means and for receiving said representation of a control action clearness degree from said approximate reasoning means and for mapping said representations of control action fuzzy patterns and said representation of a control action clearness degree into said output signals.

14. The fuzzy logic controller of claim 13 in which said fuzzifier first means comprises means to compare said process input signals with said representations of thresholds of transitions contained in said knowledge-base such that each of said process input signals is mapped into a corresponding representation of a fuzzy pattern.

15. The fuzzy logic controller of claim 14 in which said fuzzifier second means receives said process input signals and said representations of input fuzzy patterns generated by said fuzzifier first means from said process input signals, said fuzzifier second means comprising means for selecting a clearness distribution from said knowledge-base corresponding to each of said input fuzzy patterns, and means for utilizing each said clearness distribution, and the input signal utilized by said fuzzifier first means in generating the representation of the fuzzy pattern which corresponds to said clearness distribution, to generate a representation of a clearness degree.

16. The fuzzy logic controller of claim 15 wherein each clearness distribution has an x-axis representing the range of input variable values for the fuzzy pattern which is associated with the input variable and which corresponds with said each clearness distribution and a y-axis representing clearness degrees and wherein said means for utilizing each said clearness distribution, and the process input signal utilized by said fuzzifier first means in generating the representation of the fuzzy pattern which corresponds to said clearness distribution, locates said process input signal on the x-axis of said clearness distribution and projects said process input signal onto the y-axis of said clearness distribution in order to obtain the clearness degree of said input fuzzy pattern for said input signal.

17. The fuzzy logic controller of claim 15 wherein said means for mapping of said approximate reasoning means comprises means for determining the minimum value of input clearness degrees represented by said representations of input clearness degrees and for assigning said minimum value to the control action clearness degree represented by said representation of a control action clearness degree.

18. The fuzzy logic controller of claim 15 wherein said means for mapping of said approximate reasoning means comprises means for determining the maximum value of input clearness degrees represented by said representations of input clearness degrees and for assigning said maximum value to the control action clearness degree represented by said representation of a control action clearness degree.

19. The fuzzy logic controller of claim 15 wherein said means for mapping of said approximate reasoning means comprises means for determining the average value of input clearness degrees represented by said representations of input clearness degrees and for assigning said average value to the control action clearness degree represented by said representation of a control action clearness degree.

20. The fuzzy logic controller of claim 15 wherein said defuzzifier means comprises means for selecting a clearness distribution from said knowledge-base corresponding to each of said control action fuzzy patterns, and means for utilizing each said control action fuzzy pattern clearness distribution to map said representation of a control action clearness degree to a value for one of said process control signals.

21. The fuzzy logic controller of claim 20 wherein each clearness distribution has an x-axis representing the range of control action values for the fuzzy pattern which is associated with the control action and which corresponds with said each clearness distribution and a y-axis representing clearness degrees and wherein said means for utilizing each said control action fuzzy pattern clearness distribution to map said representation of a control action clearness degree to a value for one of said control signals comprises means for locating said control action clearness degree on the y-axis of said control action fuzzy pattern clearness distribution and for projecting said control action clearness degree onto the x-axis of said control action fuzzy pattern clearness distribution.

22. A method for controlling a process having process signals comprising the following steps:

mapping said process signals into representations of input fuzzy patterns;

mapping said process signals into representations of input clearness degrees of said input fuzzy patterns, said input clearness degrees defining cognitive measures which assess the fuzziness of input fuzzy patterns, said input clearness degrees being valued in the interval of zero to one, where zero represents "absolutely unclear" ("absolutely false") and one represents absolutely clear" ("absolutely true");

selecting a fuzzy rule from a collection of fuzzy rules of the type comprising representations of fuzzy patterns of consequents (THENs) and representations of fuzzy patterns of antecedents (IFs) having an antecedent matching said representations of input fuzzy patterns;

generating representations of control action fuzzy patterns based on the consequent (THEN) portion of said selected rule;

while selecting a fuzzy rule, mapping said representations of input clearness degrees into a representation of a control action clearness degree, each said control action clearness degree defining cognitive measures which assess the fuzziness of control action fuzzy patterns; and mapping said representations of control action fuzzy patterns and said representation of a control action clearness degree into output signals and inputting said process with said output signals in order to control said process.

23. The method of claim 22 wherein said step of mapping said process signals into representations of input fuzzy patterns comprises comparing each of said process signals with representations of thresholds of transitions, said thresholds of transitions being the intersection points of every two adjacent clearness distributions, said clearness distributions comprising collections of representations of clearness degrees, and selecting an input fuzzy pattern based on each such comparison.

* * * * *